July 15, 1958 R. HELL ET AL 2,843,663

DEVICE FOR TRANSMITTING STATION IDENTIFICATION IN FACSIMILE TELEGRAPHY

Filed Aug. 16, 1954 2 Sheets-Sheet 1

Inventors
Rudolf Hell,
Ewald Lifferth
and Kurt Reche.

By [signature] Att'y.

July 15, 1958 R. HELL ET AL 2,843,663

DEVICE FOR TRANSMITTING STATION IDENTIFICATION IN FACSIMILE TELEGRAPHY

Filed Aug. 16, 1954 2 Sheets-Sheet 2

Inventors.
Rudolf Hell,
Ewald Lifferth, &
Kurt Reche.
By [signature] Att'y.

United States Patent Office 2,843,663

Patented July 15, 1958

2,843,663

DEVICE FOR TRANSMITTING STATION IDENTIFICATION IN FACSIMILE TELEGRAPHY

Rudolf Hell, Kiel-Dietrichsdorf, Ewald Lifferth, Kiel, and Kurt Reche, Pullach, near Munich, Germany, assignors to Siemens & Halske Aktiengesellschaft, Berlin, Germany, a corporation of Germany Application August 16, 1954, Serial No. 449,868

Claims priority, application Germany August 14, 1953

19 Claims. (Cl. 178—7.1)

Figure 1:
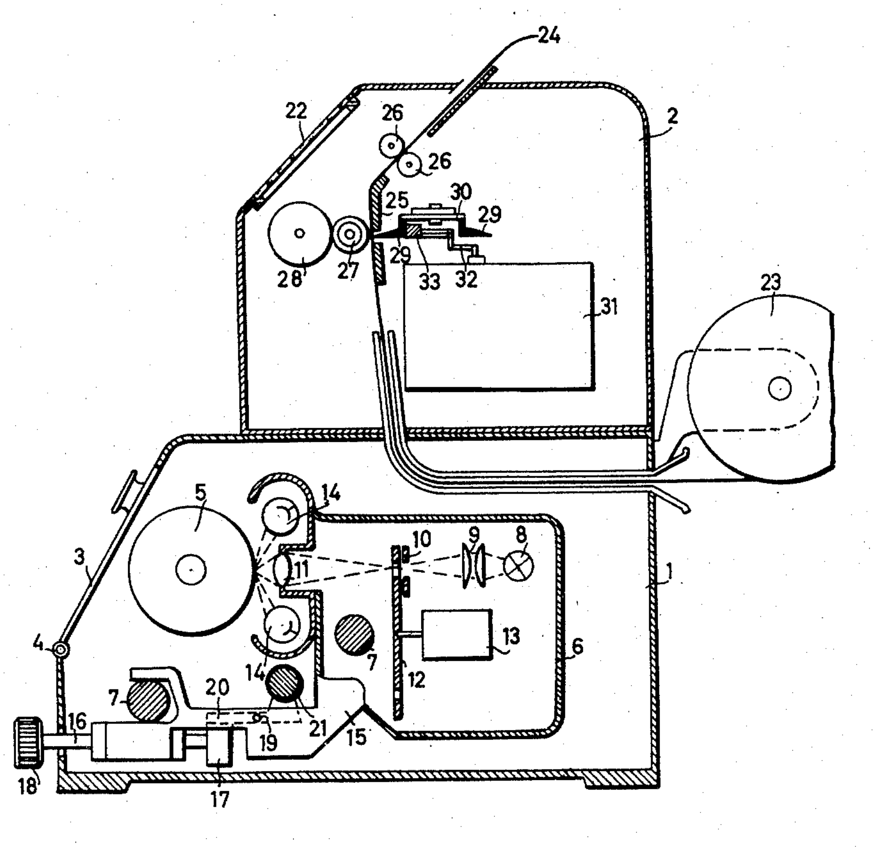

This invention relates to facsimile telegraphy and is particularly concerned with a device for transmitting the station identification.

The individual stations in teleprinter systems are equipped with devices for transmitting the station identification, such devices becoming operative responsive to the station identification signal to transmit the name of the corresponding station. Such station identification means are made as impulse transmitters for the five-code alphabet to conform to the peculiarities of the teleprinter technique; they cannot be employed in facsimile telegraphy because the recording of the transmitted symbols takes place in a manner which is entirely different from the recording of the symbols in teleprinter systems.

It was, therefore, until now the practice to transmit the station designation in facsimile telegraphy by telephone prior to the facsimile transmission. With progressive development of facsimile telegraphy to fully automatic operation appears the desirability or necessity for using automatically operating station identification. The corresponding station identification must however be adapted to the pointlike recording of the facsimile receiver and must be constructed as simply as possible.

In accordance with the invention, a fixed lettering, independent of the variable symbols to be transmitted, designating the station name is for this purpose provided upon an annular or arcuate member which rotates with the symbol transmitter drum and which is scanned by the scanning element of the transmitter. The name of the transmitting station is, therefore, in principle photoelectrically scanned, in konwn manner, just like the facsimile that is being transmitted but separate from such facsimile, and is similarly recorded in the receiver. The scanning takes place responsive to the request for the station identification. It is immaterial for the invention whether facsimile telegraphy or half-tone symbol transmission is concerned or whether the recording at the receiver is accomplished photographically, electrochemically or mechanicaly by means of inked stylus or knife-edge means. The annular lettering signifying the station name or designation is disposed upon the symbol transmission drum or upon a separate station identification drum which is suitably coupled with the symbol drum. The lettering is exchangeable, permitting provision of a corresponding name for each station.

A particularly simple arrangement is in accordance with the invention obtained by moving the scanning device of the transmitter during the symbol transmission in known manner along the rotating symbol drum while causing it to stand still during the scanning of the rotating station name identification drum. The station name drum is for this purpose mounted for rotation and also for axial shifting by a constantly rotating drive cam. The drive cam is for continuous scanning of the station name so arranged that the name drum is axially slowly shifted and abruptly brought into its initial position at the end of the scanning. In order to begin the scanning at the upper edge of the lettering of the identification name, responsive to the station identification signal, the invention provides a start device which briefly interrupts the continuous drive of the cam disk so that such disk can always rotate into the initial position by the force of a torsion spring. The station name may serve as an interval signal by continuous scanning and transmission or it may be transmitted once as an acknowledgment. A terminal contact is in the latter case actuated which is arranged at the end of the advance of the station name drum for interrupting the electrical scanning signals.

Figure 2:
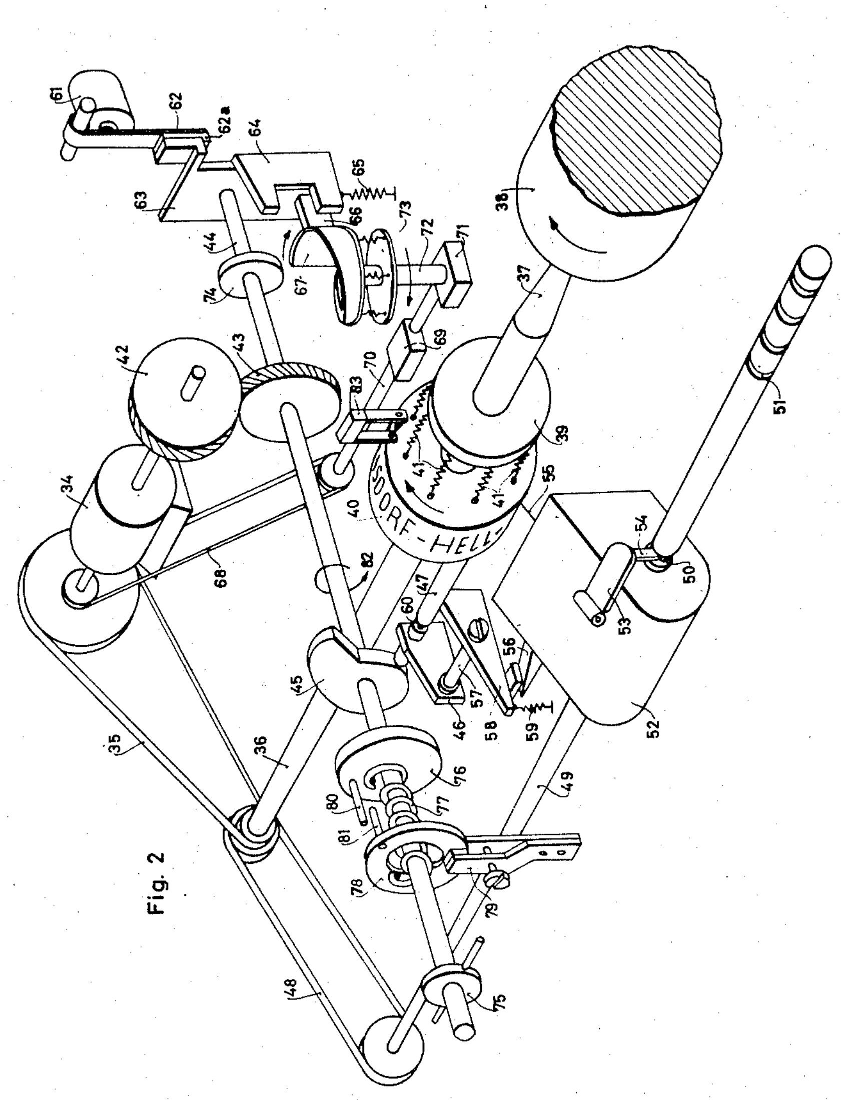

The various objects and features of the invention will now be explained with reference to the accompanying diagrammatic drawings in which Fig. 1 shows a combined facsimile transmitter and receiver apparatus comprising an associated station identifying device; and Fig. 2 illustrates details of an embodiment of the station identification device made in accordance with the invention.

Fig. 1 shows a transmitter 1 on which is provided a receiver 2. Both apparatus are driven in common by the motor of the receiver 2. The casing of the transmitter 1 is provided with a door 3 which is pivoted at 4 for gaining access to the picture or symbol image drum 5. A scanning slide 6 is provided for sliding motion relative to the drum 5 which is guided along two rails 7. The slide contains an illuminating source 8 which illuminates the picture point or dot shutter 10 over the condenser 9. The objective 11 reproduces the symbol dots on the drum 5. A perforated disk 12 rotated by the motor 13 is disposed in the light beam path. The light reflected from the image carried on the drum 5 falls into the two photoelectric cells 14 and is, in known manner, converted into an electric current which is in known manner amplified and conducted to the transmission line. From the scanning slide 6 extends a bracket 15 in which is journalled the shaft 16 carrying at one end thereof an eccentric disk 17 which is rotatable by 180° by means of the knob 18. The eccentric 17 engages a lever arm 20 which is pivoted at 19, the other end of said lever arm forming a grip for engagement with the threaded slide or advance spindle 21. Rotation of the eccentric 17 releases the grip of the lever arm 20 from engagement with the thread or spiral groove of the spindle 21 and the entire scanning slide 6 may then be moved manually by means of the knob 18 so as to adjust the slide relative to the image drum 5. The station name transmitting device is disposed upon the shaft of the image drum 5, in back of such device as seen in Fig. 1, and therefore invisible in such figure. The image drum 5 and the slide advance spindle 21 are connected by suitable gear wheels.

The receiver 2 disposed upon the casing 1 of the transmitter is provided with a window 22 for observing the recording. Numeral 23 indicates a supply reel for the wide paper sheet 24 which is guided on suitable sheet guides and lies taut along the table 25. The width of the paper sheet 24 corresponds to the circumference of the image drum 5. The advance of the paper is controlled by the draw rollers 26. The printing spiral 27 which is continuously inked by the ink roller 28 rotates in front of the table 25. An endless chain 30 carries scanning members 29 spaced thereon by intervals corresponding to the width of the paper sheet and one of these scanning members 29 is therefore always disposed within the cutout in the table 25. The magnet system 31 operates a printer bar 33 over a link 32 in step with the image impulses to press the respective scanning member which happens to move within the slot in the table 25 against the paper 24 and the latter against the printer spiral 27 so as to effect in known manner the recording of the image elements. The magnet system 31 is connected with the transmission line and may be connected with its associated transmitter 1 so as to effect recording for control purposes. The shafts for the elements 26, 27, 28 and 30 are coupled for common control.

Referring now to Fig. 2, the motor 34, which is conveniently illustrated as a part of the drive of the receiver 2 on the transmitter 1 shown in Fig. 1, drives the main shaft 36 over the belt 35. The shaft 36 is connected with the removable image drum 38 over the frusto conical member 37. Fixed upon the shaft 36 is the disk 39 and the axially movable annular or arcuate member 40 forming the station name drum which is splined to the shaft and pressed away from the disk 39 by the springs 41. The motor 34 also drives the gears 42/43 for rotating the shaft 44 carrying the drive cam disk 45. Movably journalled in the bracket 46 is the bolt 47 one end of which is in engagement with the drive cam 45 while its other end engages the name or station identification drum 40. Rotation of the drive cam 45 causes displacement of the bolt 47 and therewith corresponding motion of the station name drum 40 in the direction of the fixed disk 39. The bolt 47 will always abruptly return along the transfer portion of the curve of the drive cam 45 allowing the station name drum 40 to return correspondingly into the initial position. The station name drum 40 is in this manner slowly advanced and quickly restored, for example, 16 times per second.

The shaft 36 also drives the belt 48 for rotating the advance spindle 49 which is provided with an annular groove 50 and with the advance thread or spiral groove 51. The scanning slide 52, which corresponds to the slide 6 in Fig. 1, is shiftable on the spindle 49. Upon the slide 52 is disposed a pivoted bracket 53 carrying a grip or latch 54. The latch 54 engages the advance thread 51 for the time when the scanning slide 52 is within the range of the image drum 38. The scanning beam of the scanning slide 52 is symbolically indicated by the line 55. The scanning slide 52 is thus advanced along the image drum 38 during the rotation of the drum. Lifting of the bracket 53 permits shifting of the scanning slide upon the spindle 49 within the range of the station name drum 40. The latch 54 engages the annular groove 50 and holds the scanning slide 52 in such position relative to the station name drum 40. The scanning slide 52 thus stands still during the rotation of the station name drum, the latter being separately axially advanced by the operation of the drive cam 45.

A wedge member 56 extending from the scanning slide 52 lifts the lever arm 58, pivoted at 57, from the bolt 47, during the time when the scanning slide 52 is positioned within the range of the station name drum 40; but when the scanning slide 52 is brought within the range of the image drum 38, the wedge 56 will free the lever arm 58 and the spring 59 will displace such lever arm and cause it to engage the annular groove in the bolt 47 at the time when such bolt has reached the end of its advance. The advance of the station name drum 40 is thus stopped.

The operative release of the station identification is effected responsive to the identification call signal which may cause switching in of the scanning signals in the called station. The scanning slide is at such time positioned within the range of the station name drum 40 and the motor 34 is in operation. The station identification call signal also effects over suitable circuit means the actuation of the start magnet 61 which attracts its armature 62 carrying the bracket **62*a* to release the journal bracket 63. The latter carries an extension 64, provided with a cutout, and is responsive to such release pulled downwardly by the spring 65. The cutout in the extension 64 releases the ear 66 which projects from the curve tray 67. The curve tray 67 is now caused to rotate through the medium of the belt 68, gear 69, shaft 70, gear 71, shaft 72 and the slip clutch 73. The rotation of the curve tray 67 is however prevented by the ear 66 in engagement with the extension 64 so long as the journal bracket 63 is held by the armature 62. The shaft 72 idles in such case with respect to the slip clutch 73**.

The gears 42 and 43 are separated by the downward displacement of the journal bracket 63 and the disk 74 is at the same time brought into engagement with the curve tray 67. The bearing 75 for the shaft 44 is suspended in universal manner so as to permit the displacement of the shaft responsive to separation of the gears 42 and 43. The curve tray 67 rotates clockwise and the shaft 44 is accordingly lifted again until the bearing or journal bracket 63 is again latched in engagement with the armature 62 which has meanwhile been released. The gear wheels 42 and 43 now mesh again. The curve tray continues to rotate until its ear 66 engages the extension 64 when it stops.

Upon the shaft 44 is disposed a disk 76 to which is anchored a torsion spring 77 carrying at its free end the annular ringlike member 78. The latter is engaged by a brake 79. The disk 76 winds the spring 77 during the rotation of the shaft 44 by the gear wheel 42 until the follower 80 hits the stop 81. The ringlike member 78 is from this instant on rotated by the disk 76 against the braking action of the brake 79. The torsion spring 77 unwinds and rotates the disk 76 back to initial position responsive to separation of the gear wheels 42/43 upon actuation of the start magnet 61. The drive cam 45 is coincidentally also rotated into its initial position—opposite to the direction of rotation indicated by the arrow 82—until its straight transfer edge engages the bolt 47. The upper edge of the station name drum 40 is at this instant opposite the scanning beam 55.

It will be seen from the foregoing explanations that the brief separation of the gears 42/43, upon receipt of the start signal impulse, always causes displacement of the station name drum 40 into its initial position so that the scanning of the station name can always begin at the upper edge of the corresponding lettering. The station name or identification transmitter may therefore be switched in at any desired instant and the scanning of the name will nevertheless always start at the upper edge of the lettering.

The station name drum will be periodically scanned throughout the operation of the station identification transmitter. However, if it is desired that the station name should be scanned but once, the contact 83 may be suitably connected in the circuit of the scanning element of the scanning slide 52. The contact 83 will then be actuated by the station name drum 40 always when the drum has reached the end of its slow advance stroke by the action of the drive cam 45. The face of the drum 40 will press against the contact 83, actuating such contact which may control a suitable circuit comprising in known manner a relay and such relay, upon energization may control suitable means for stopping the transmission of the station identification. The scanning slide 52 is thereupon manually placed in position within the range of the image drum 38 so as to carry out the symbol transmission.

Assuming that two stations having combined transmitter-receiver apparatus are in communication, the transmitting station will prepare the image drum by placing thereon the desired image or writing. This station thereupon transmits the call signal and a relay, for example, a known frequency responsive relay is thereby actuated in the other station. This latter relay switches in the circuit for its scanning slide 52 and simultaneously closes a circuit for its associated start magnet 61, and the latter initiates the operation of the station identifier as described before. The corresponding station name is received at the calling station and is recorded. The stop contact 83 terminates the station identifying operation. The calling station now switches in its own station identifying device and after the corresponding scanning of the station name moves its scanning slide 52 into the range of the image drum 38 whereupon the message transmission begins. Both receivers at the two stations record for control purposes their own station names and transmitted texts. Faulty recording is prevented by known interlock means.

As has been indicated before, the arcuate member 40 forming the station name drum may be formed at a section of the picture image drum 38. The entire station name drum may, of course, be exchangeable or only the lettering thereon may be exchangeable by suitably securing a strip carrying such lettering.

The above indicated and other modifications and changes may be made within the scope and spirit of the appended claims which define what is believed to be new and desired to have protected by Letters Patent.

We claim:

1. In facsimile telegraph apparatus having an image drum carrying symbols to be transmitted and having a scanning element for scanning said symbols together with means for rotating said image drum and for advancing said scanning element relative thereto so as to scan said symbols for transmission thereof, a station name transmitter comprising an arcuate member carrying separate symbols designating the corresponding station name, means for rotating said arcuate member coincident with the rotation of said image drum, means for causing said scanning element to scan said arcuate member spirally to cause transmission of said station identifying symbols carried thereby, and means independent of said scanning element for axially displacing said arcuate member.

2. The structure and cooperation of parts as defined in claim 1, wherein said arcuate member is arranged upon said image drum.

3. The structure and cooperation of parts as defined in claim 1, comprising means for coupling said arcuate member with said image drum.

4. The structure and cooperation of parts as defined in claim 1, comprising means for exchangeably disposing said arcuate member.

5. The structure and cooperation of parts as defined in claim 1, comprising means for exchangeably disposing said separate symbols on said arcuate member.

6. The structure and cooperation of parts as defined in claim 1, comprising a rotating drive cam for periodically axially reciprocating said arcuate member.

7. The structure and cooperation of parts as defined in claim 1, comprising means for arresting the advance of said scanning element for scanning within the range of said axially displaced arcuate member.

8. The structure and cooperation of parts as defined in claim 1, comprising a spindle for advancing said scanning element, an annular groove and a spiral groove being respectively formed in said spindle, and a latch member coacting with said scanning element for respectively engaging said annular groove or said spiral groove to cause said scanning element to carry out respective scanning of said arcuate member or said image drum.

9. The structure and cooperation of parts as defined in claim 1, comprising means for blocking the advance of said arcuate member, and means for freeing said blocking to cause advance thereof for scanning by said scanning element.

10. The structure and cooperation of parts as defined in claim 6, comprising a start magnet, a start element controlled by said start magnet responsive to a start impulse received thereby, and means controlled by said start element for briefly interrupting the operation of said drive cam.

11. The structure and cooperation of parts as defined in claim 10, comprising a torsion spring for rotating said drive cam into its initial position subsequent to the interruption of the rotation thereof.

12. The structure and cooperation of parts as defined in claim 11, comprising a brake for controlling the operation of said torsion spring.

13. The structure and cooperation of parts as defined in claim 1, comprising contact means in the path of axial displacement of said arcuate member for controlling the termination of scanning thereof by said scanning element.

14. In fascimile telegraph apparatus having a drum for mounting an image to be transmitted and having means for rotating said drum with said image and a scanning element and means for moving said scanning elemen relative to said rotating drum so as to scan such image for the transmission thereof, a station name transmitter comprising an arcuate member carrying a station identifying symbol, means for rotating said arcuate member coincident with the rotation of said image-carrying drum, control means for axially displacing said arcuate member during the rotation thereof, means for positioning said scanning element for scanning said arcuate member for the transmission of said station identifying symbol carried thereby, and means for thereafter positioning said scanning element for displacement relative to said drum to scan the image carried thereby for the transmission of said image.

15. The structure and cooperation of parts as defined in claim 14, wherein said control means comprises a drive cam and a drive means for rotating such cam to displace said arcuate member axially periodically relatively slowly from an initial position to a predetermined axial advance position and abruptly back to its initial position, a start magnet for receiving a start signal impulse, means controlled by said start magnet responsive to the receipt of said start signal impulse for interrupting the drive means for rotating said drive cam, means for thereafter restoring the drive means for continuing the rotation of said drive cam, and means actuated during the interval of interrupted rotation of said drive cam for rotating such cam to move said arcuate member into a predetermined axial start position relative to said scanning element to initiate scanning of said station identifying symbol carried by said arcuate member.

16. The structure and cooperation of parts as defined in claim 15, comprising spring means for biasing said arcuate member in the direction of its normal axial position, an intermediate element disposed between said drive cam and said arcuate member and actuated by said drive cam for axially displacing said arcuate member, and means controlled by said scanning element for locking said intermediate element to inhibit axial displacement of said arcuate member in a predetermined position of said scanning element.

17. The structure and cooperation of parts as defined in claim 15, wherein said drive means comprises a motor-driven gear wheel and a gear wheel driven thereby, the means controlled by said start magnet being effective to disengage said gear wheels for interrupting the rotation of said drive cam, a motor-driven restoring cam for thereafter causing reengagement of said gear wheels to continue the rotation of said drive cam, means controlled by said restoring cam for rotating said drive cam in opposite direction during the interval of its interrupted operative rotation, and torsion spring means wound during the rotation of said drive cam into opposite direction for subsequently placing said cam into initial angular position to displace said arcuate member to its initial normal axial position for scanning by said scanning element.

18. The structure and cooperation of parts as defined in claim 15, comprising a spindle for advancing said scanning element relative to said image-carrying drum, and manually operative means for placing said scanning element in position for scanning said arcuate member or said image on said drum, respectively.

19. The structure and cooperation of parts as defined in claim 18, comprising a latch member, a spiral groove and an annular groove being respectively formed on said spindle, means for disposing said latch member in engagement respectively with said annular groove or said spiral groove, said scanning element standing still when said latch member is in engagement with said annular groove adapting said scanning element to scan said arcuate member while such member is axially displaced by said drive cam while being axially displaced relative to said image on said rotating drum when said latch member is in engagement with said spiral groove so as to adapt said scanning element to scan said image on said drum.

References Cited in the file of this patent

UNITED STATES PATENTS 2,425,019 Wise ------------------ Aug. 5, 1947